(No Model.) 2 Sheets—Sheet 1.

S. J. ANDERSON.
HOT WATER HEATING APPARATUS.

No. 528,061. Patented Oct. 23, 1894.

WITNESSES:
A. D. Harrison
Rollin Abell

INVENTORS:
S. J. Anderson
by Wright Brown Crossley
Attys.

(No Model.) 2 Sheets—Sheet 2.

S. J. ANDERSON.
HOT WATER HEATING APPARATUS.

No. 528,061. Patented Oct. 23, 1894.

WITNESSES:
A. D. Harrison.
Rollin Abell.

INVENTOR:
S. J. Anderson
by Wight Brown Crosley
Attys

UNITED STATES PATENT OFFICE.

SVEN J. ANDERSON, OF EVERETT, MASSACHUSETTS, ASSIGNOR OF ONE-HALF TO NELS M. ANDERSON, OF SAME PLACE.

HOT-WATER HEATING APPARATUS.

SPECIFICATION forming part of Letters Patent No. 528,061, dated October 23, 1894.

Application filed April 2, 1894. Serial No. 506,027. (No model.)

*To all whom it may concern:*

Be it known that I, SVEN J. ANDERSON, a subject of the King of Sweden and Norway, and residing at Everett, in the county of Middlesex and State of Massachusetts, have invented certain new and useful Improvements in Hot-Water Heating Apparatus, of which the following is a specification.

This invention has for its object to provide a simple and efficient water heating apparatus adapted to utilize the heat from the fuel employed, and it consists in the improved construction which I will now proceed to describe and claim.

Figure 1:
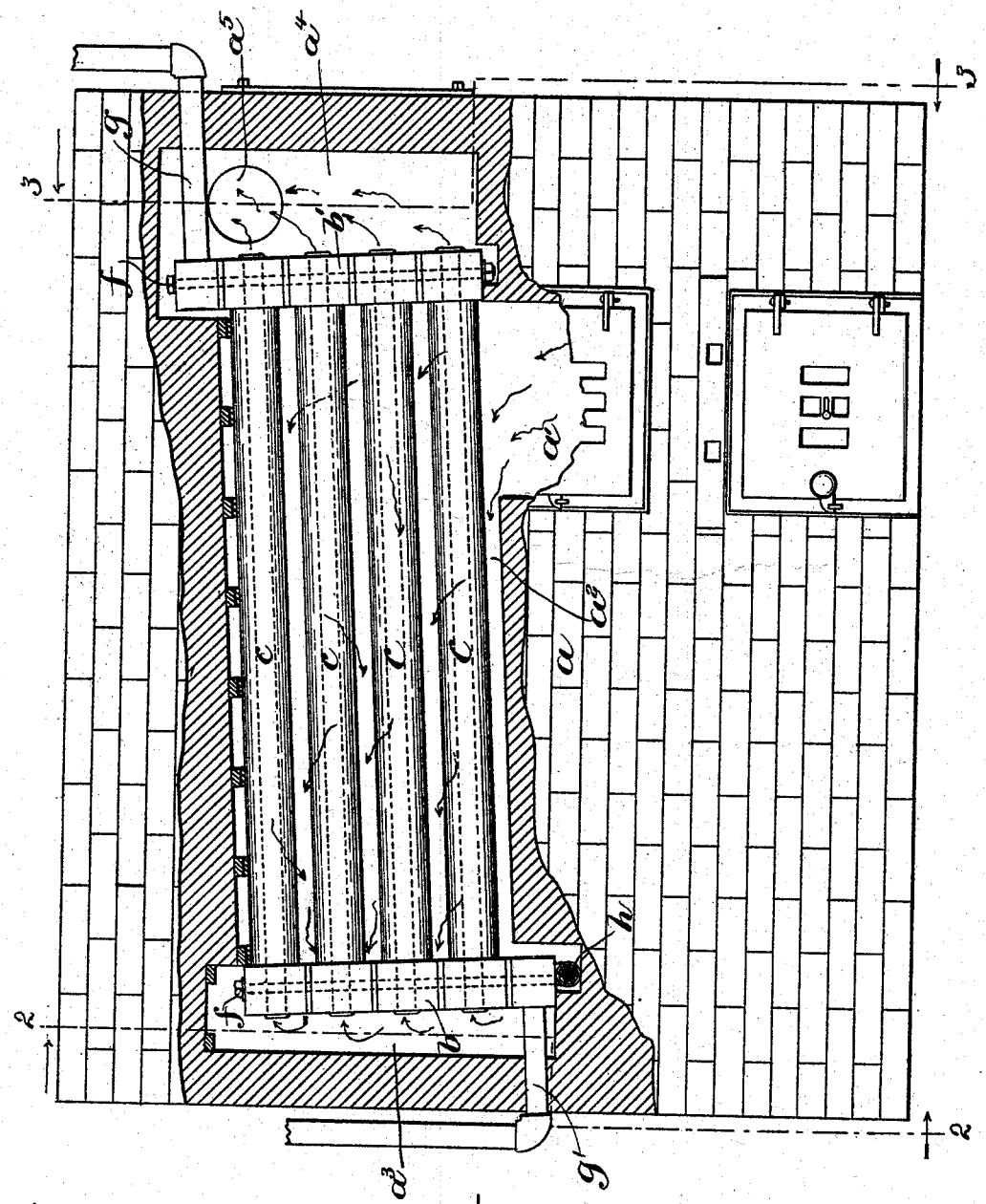
Figure 2:
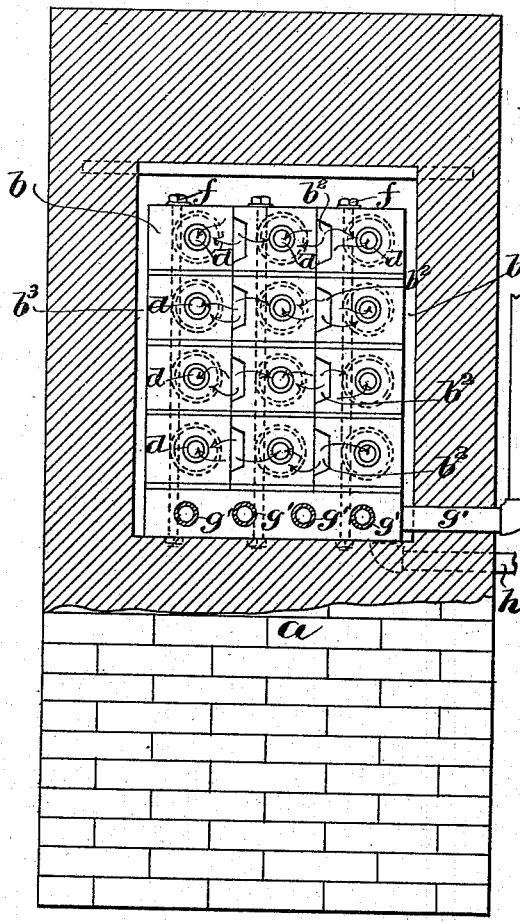
Figure 3:
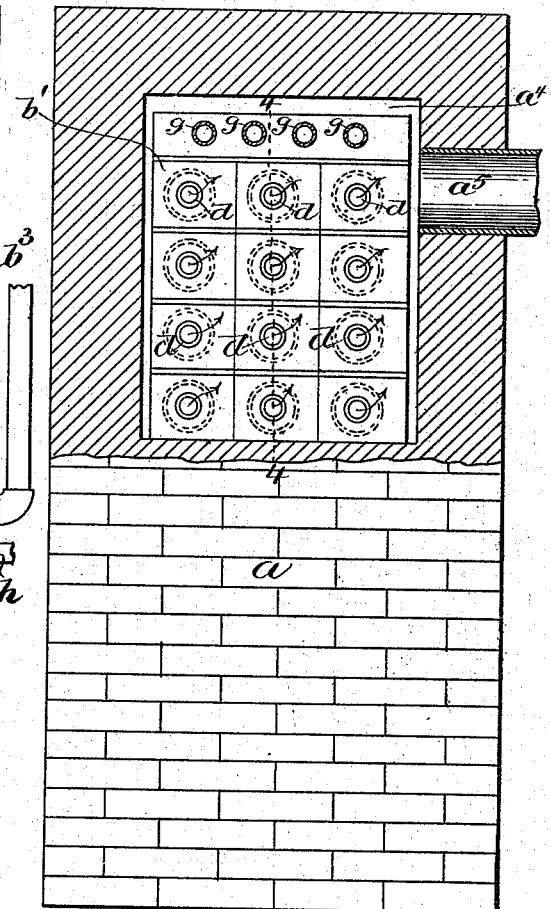
Figure 4:
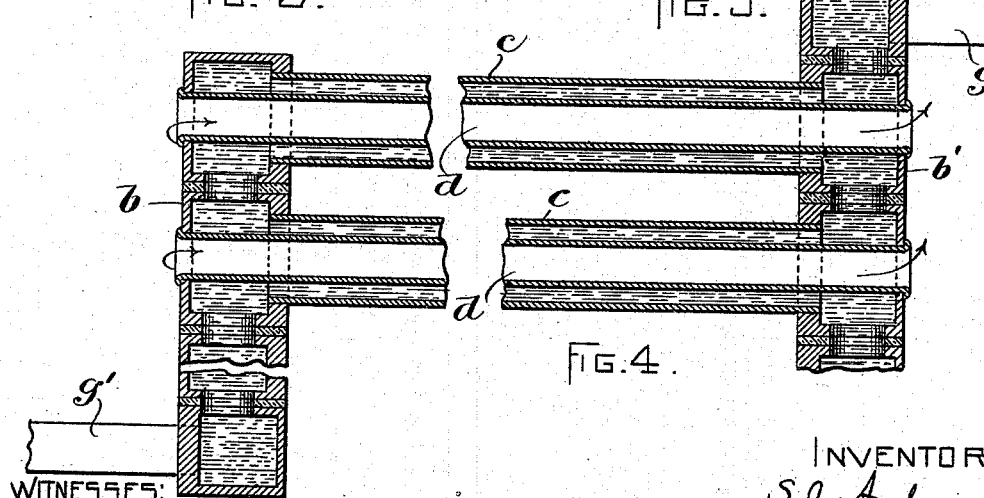

Of the accompanying drawings, forming part of this specification,—Figure 1 represents a side elevation of a heater embodying my invention, the casing being shown partly in section. Fig. 2 represents a section on line 2—2 of Fig. 1, looking toward the right. Fig. 3 represents a section on line 3—3 of Fig. 1, looking toward the left. Fig. 4 represents a section on line 4—4 of Fig. 3.

The same letters of reference indicate the same parts in all the figures.

In the drawings—$a$ represents a casing suitably constructed of brick or other suitable material, and containing a fire-box $a'$ and a chamber $a^2$ communicating with said fire-box.

$b\ b'$ represent substantially vertical water-containing headers, which are annexed to constitute the end walls of the chamber $a^2$ and to separate the latter from end spaces $a^3\ a^4$ between the headers and the end walls of the casing $a$.

$c\ c$ represent tubes which connect the headers $b\ b'$, the said headers and tubes constituting a water receptacle through which water can freely circulate, the arrangement being preferably such that water entering the lower part of the header $b$ can flow upwardly therein to the upper part, and laterally through each tube $c$ to the header $b'$, the tubes being preferably inclined as shown in Fig. 1, so that the circulation caused by the heat will cause a natural movement of water from the header $b$ to the header $b'$.

The products of combustion from the fire-box enter the chamber $a^2$ and pass in the direction of the arrows toward the header $b$, the header $b'$ affording no outlet from said chamber. The headers are made in sections, as shown, said sections being connected by bolts $f$ or other suitable means. Each section forming the header $b$ has a recess formed in one side, and these recesses, when the sections are bolted together, form flues or openings $b^2\ b^2$, for the passage of the products of combustion from the chamber $a^2$ to the end space $a^3$. This construction provides for an equal sub-division of the products of combustion and their distribution to the flues $d\ d$, presently described, for the reason that there is one opening $b^2$ for each flue $d$ and close to it.

It will be seen that the return flues $d$ constitute the inner walls of annular water spaces the outer walls of which are the tubes $c$, hence all the water in said tubes is disposed in thin annular streams exposed on both sides to the heated products of combustion. The heat of the fire is therefore very fully utilized, the products of combustion acting first on the outer surfaces of the tubes $c$ and on the headers, and then on the inner surfaces of the flues $d$.

$g\ g$ represent the flow pipes which conduct the water from the upper portion of the header $b'$ to the radiators, and $g'\ g'$ represent the return pipes which return the water from the radiators to the lower portion of the header $b$.

$h$ represents an outlet pipe for use in emptying the headers, tubes, and pipes.

I claim—

1. A hot water heater composed of headers formed of sections secured together, tubes connected at their ends with said headers and separated by spaces or passages adapted to receive the products of combustion from a fire-box, and return flues extending through the headers and through the tubes and constituting the inner walls of annular water spaces in said tubes, said passages conducting the products of combustion in one direction along the outer surfaces of the tubes while the return flues conduct said products of combustion back through the headers and tubes to the chimney, one of said headers having a series of openings for the passage of the products of combustion.

2. A hot water heater comprising in its construction two headers formed to constitute the end walls of a chamber over a furnace or fire-box, and composed of sections one of said headers having transverse flues connecting said chamber with the space at the outer side of said header, tubes connected with said headers adjacent to said transverse flues and extending through said chamber, and return flues extending through the headers and tubes and constituting the inner walls of annular water spaces, the said chamber and transverse flues conducting the products of combustion in one direction along the outer surfaces of the tubes and through one of the headers while the return flues conduct said products in the opposite direction through the headers and tubes, as set forth.

3. In a hot water heater, the combination of a fire-box, a casing having a chamber communicating with the fire-box, two substantially vertical headers constituting the end walls of said chamber and composed of sections secured together, tubes communicating with said headers and extending through said chamber, one of said headers having each of its sections provided with a recess to form flues or openings connecting the chamber with an end space outside the said header, return flues extending through the headers and tubes and connecting said end space with another end space communicating with the chimney, flow pipes connected with the upper portion of one header, and return pipes connected with the lower portion of the other header, as set forth.

In testimony whereof I have signed my name to this specification, in the presence of two subscribing witnesses, this 28th day of March, A. D. 1894.

SVEN J. ANDERSON.

Witnesses:
C. F. BROWN,
NELS M. ANDERSON.